United States Patent
Huebner et al.

(10) Patent No.: US 8,412,450 B1
(45) Date of Patent: Apr. 2, 2013

(54) METHOD FOR NAVIGATING IN GPS DENIED ENVIRONMENTS

(75) Inventors: Jonathan D. Huebner, Ridgecrest, CA (US); Sam Ghaleb, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 340 days.

(21) Appl. No.: 12/726,025

(22) Filed: Mar. 17, 2010

(51) Int. Cl.
*F41G 9/00* (2006.01)
*G06F 17/10* (2006.01)
*G06G 7/78* (2006.01)

(52) U.S. Cl. .................................................. 701/302

(58) Field of Classification Search .......... 701/300, 701/302, 408, 410, 412, 426, 429, 431, 438, 701/474
See application file for complete search history.

(56) References Cited

U.S. PATENT DOCUMENTS

| | | | |
|---|---|---|---|
| 4,281,809 A * | 8/1981 | Oglesby et al. | 244/3.16 |
| 4,448,106 A * | 5/1984 | Knapp | 89/1.11 |
| 5,070,790 A * | 12/1991 | Le Parquier et al. | 102/513 |
| 5,199,374 A * | 4/1993 | Blanchette | 116/209 |
| 5,400,134 A * | 3/1995 | Obkircher | 356/141.2 |
| 6,157,875 A | 12/2000 | Hedman et al. | |
| 6,196,496 B1 * | 3/2001 | Moskovitz et al. | 244/3.15 |
| 7,703,679 B1 | 4/2010 | Bennetts et al. | |
| 8,299,959 B2 * | 10/2012 | Vossiek et al. | 342/157 |
| 2003/0227412 A1 * | 12/2003 | Stewart | 343/705 |
| 2007/0090926 A1 | 4/2007 | Potyrailo et al. | |
| 2007/0241227 A1 | 10/2007 | Zemany et al. | |
| 2008/0150691 A1 | 6/2008 | Knadle et al. | |
| 2008/0224947 A1 | 9/2008 | Werner et al. | |
| 2009/0212108 A1 | 8/2009 | Rothe et al. | |
| 2010/0214163 A1 * | 8/2010 | Nichols et al. | 342/357.06 |

* cited by examiner

*Primary Examiner* — Ryan Zeender
*Assistant Examiner* — Kristie A Mahone
(74) *Attorney, Agent, or Firm* — Christopher L. Blackburn

(57) ABSTRACT

A method for allowing accurate navigation to a target regardless of GPS jamming levels. A method to update the navigation solution of an object being navigated toward a target based upon seeker measurements in at least one of three electromagnetic frequency domains: infrared, visible, and radio frequency (RF).

1 Claim, 1 Drawing Sheet

METHOD FOR NAVIGATING IN GPS DENIED ENVIRONMENTS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to a method for allowing accurate navigation to a target regardless of GPS jamming levels.

Figure 1:
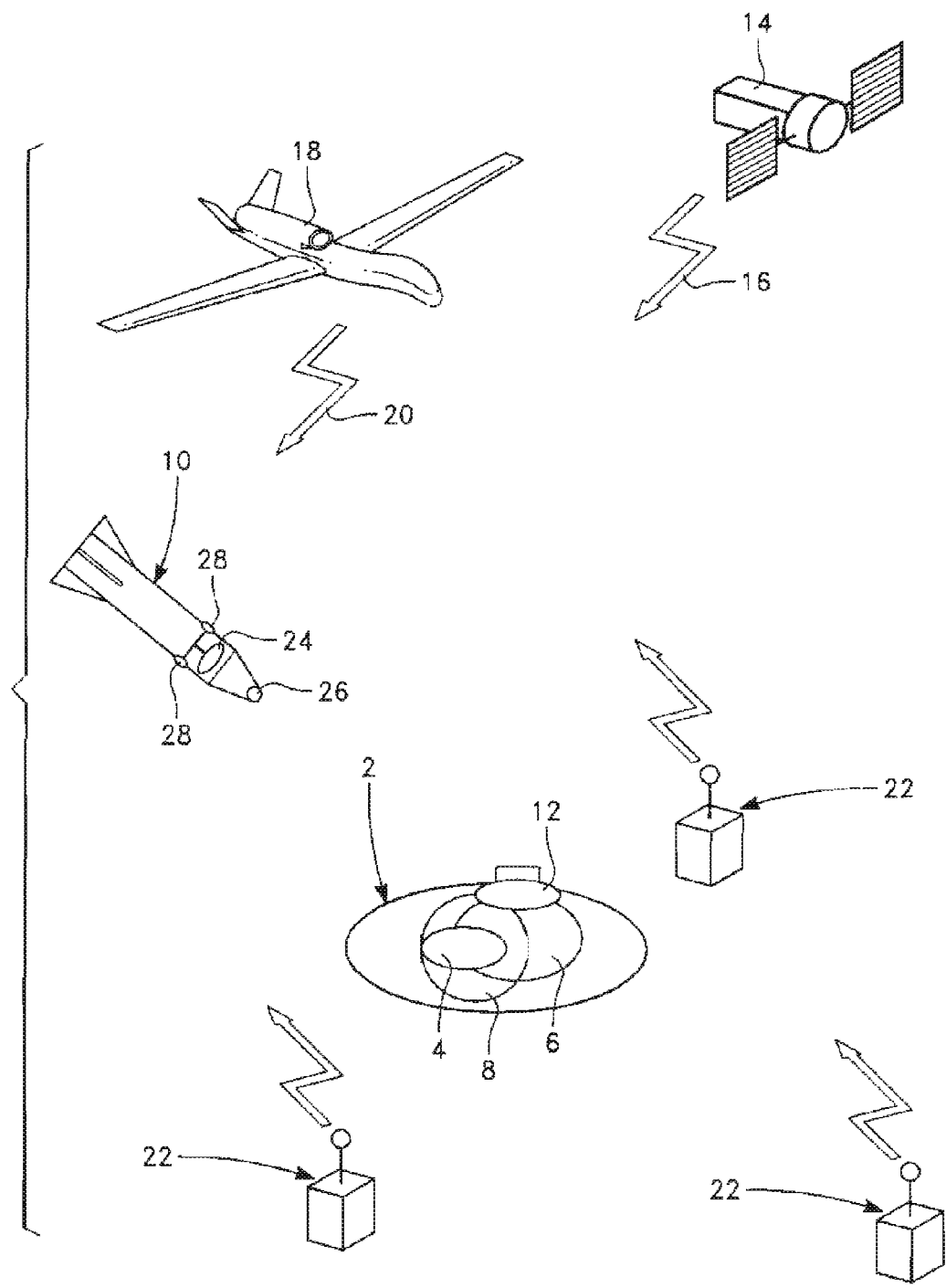
FIG. 1 is a drawing of an embodiment of various components that are used in some embodiments of a method performed in accordance with the principles of the invention.

It is to be understood that the foregoing and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawing and in the appended claims.

DETAILED DESCRIPTION OF EMBODIMENTS OF THE INVENTION

Embodiments of the invention generally relate to a method for allowing accurate navigation to a target regardless of GPS jamming 22 levels. Additionally, embodiments of the invention provide a method to update the navigation solution based upon seeker measurements in at least one of three electromagnetic frequency domains: infrared, visible, and radio frequency (RF). At least three markers (having a marker substance) are deployed (creating a mark 2, 4, 6, and 8 of FIG. 1) no farther from the target 12 than the distance at which the capability of the inertial navigation system and the capability of the seeker allow the object being navigated 10 to be navigated/guided to the target 12.

Embodiments of the invention include a marker having a marker substance. The marker substance is a substance (which can be a solid matter, such as, for example, a powder, liquid matter, something in between, including a gelatinous matter) that has, but is not limited to, at least one of the following: 1) an exothermic material which glows in the infrared (IR); 2) a bright day-glow color detectable by an electro-optic seeker; and 3) a radio frequency ID (RFID) or a material which reflects, or responds to, radio frequency or millimeter wave signals. In embodiments, the substance includes pain-like material having at least one of an exothermic material which glows in the infrared (IR), a bright day-glow color detectable by an electro-optic seeker, a radio frequency ID (RFID) or a material which reflects, or responds to, radio frequency or millimeter wave signals.

The marker substance is housed in a container and is dispersed from an aerial vehicle including a Joint Standoff Weapon (JSOW).

The material that houses the marker substance and that is dispersed from an aerial vehicle is any material that ruptures in response to contact associated with the material landing at its destination, thereby releasing the marker substance and creating a mark (2, 4, 6, and 8 of FIG. 1). In one embodiment, the material that includes the marker substance is a balloon type material.

In another embodiment, the marker substance is housed in a container and dispersed using a gas when the marker lands at its destination.

Radio Frequency Identification (RFID) tags provide a method of remotely storing and retrieving data using a small object attached to or incorporated into a substance. RFID tags enable data to be transmitted via a portable device called a tag, read by a reader, and processed according to the needs of the particular application.

In embodiments, transmitted data provides information that can be used to determine the location of the object being navigated relative to the target. Data can be printed or etched on an electronic substrate and then embedded in a plastic or laminated paper tag.

Tags are classified according to their radio frequency: low-frequency, high frequency, UHF and microwave. Low-frequency tags are commonly used in automobile anti-theft systems and animal identification. High-frequency tags are used in library books, pallet tracking, building access, airline baggage tracking, and apparel tracking. Low- and high-frequency tags can be used without a license. UHF tags are also used to track pallets, containers, trucks, and trailers. UHF cannot be used globally as there is no one global standard. Microwave tags are used in long-range access.

Also, tags may be either passive or active. Passive tags do not have their own power supply. Their power comes from a minute electrical current induced by an incoming radio-frequency scan. Active tags have their own power source. The lack of a power source makes the passive tag much less expensive to manufacture and much smaller (thinner than a sheet of paper) than an active tag. As a result, the vast majority of RFID tags are passive. However, the response of a passive tag is typically just an ID number. Active tags have longer ranges, the ability to store more information, and are more accurate and reliable.

The tag includes a transponder with a digital memory chip with a unique electronic product code. A stationary or hand-held device called an interrogator, having an antenna, transceiver, and decoder, emits a signal creating an electromagnetic zone. When a tag comes within the range of a seeker, it detects an activation signal that causes the tag to activate and start sending data. The seeker captures the data encoded in the tags integrated circuit, decodes it, and uses it for processing information to enable the weapon to guide to the desired target.

The object being navigated 10 includes a single, dual, or tri-mode seeker. For purposes of illustration, an object being navigated 10 is illustrated as having tri-mode seeker capability; however, a single, dual, or tri-mode seeker can be used in accordance with the principles of the invention. An object being navigated that has a single mode seeker is capable of one of the following: 1) passively detecting infrared via an infrared seeker 26; 2) passively detect Electro-optic signals via an Electro-optic seeker 28; and 3) detect (and, in some embodiments, actively emitting) radio frequency or millimeter wave signals via a radio frequency (RF) seeker 24. An object being navigated that has a dual mode seeker is capable of two of the following: 1) passively detecting infrared via an infrared seeker 26; 2) passively detecting Electro-optic signals via an Electro-optic seeker 28; and 3) detecting (and, in some embodiments, actively emitting) radio frequency or millimeter wave signals via a radio frequency (RF) seeker 24. An object being navigated that has tri-mode seeker is capable of all of the following: 1) passively detecting infrared via an infrared seeker 26; 2) passively detecting Electro-optic signals via an Electro-optic seeker 28; and 3) detecting (and, in some embodiments, actively emitting) radio frequency or millimeter wave signals via a radio frequency (RF) seeker 24.

Once the marker has landed, ruptured, and the marker substance has been released, (thereby creating a mark 2, 4, 6, and 8 of FIG. 1), the location of a target(s) 12 can be identified as follows.

In one embodiment, a satellite 14 recognizes/identifies the pattern and location of the marks (2, 4, 6, and 8 of FIG. 1) by detecting at least three of the marks (2, 4, 6, and 8 of FIG. 1) and/or a signal communicated by at least three of the marks (2, 4, 6, and 8 of FIG. 1); the satellite 14 also communicates the location of the target 12 to the object being navigated 10 via a data link 16 from the satellite 14 to the object being navigated 10. The object being navigated 10 receives/detects at least one signal (in any one, two, or three—depending on the embodiment—of the three signal frequencies) from at least three of the marks (2, 4, 6, and 8 of FIG. 1) via the single, dual, or tri-mode seeker on the object being navigated 10 that allows the object being navigated 10 to actively calculate the angle, angular rates, ranges and/or range rates to the marks (2, 4, 6, and 8 of FIG. 1) (in any one, two, or three—depending on the embodiment—of the three signal frequencies). Using the calculated angle, angular rates, ranges and/or range rates to the marks and the information transmitted to the object being navigated 10 (the location of the marks), the location of the object being navigated 10 can be determined and its navigation solution updated. As the object being navigated 10 knows the location of the target 12 as well as its present location, the object being navigated 10 can then calculate a route to the target 12.

In another embodiment, an unmanned aerial vehicle (UAV) 18 recognizes/identifies the pattern and location of the marks (2, 4, 6, and 8 of FIG. 1) by detecting at least three of the marks (2, 4, 6, and 8 of FIG. 1) and/or a signal communicated by at least three of the marks (2, 4, 6, and 8 of FIG. 1); the UAV 18 also communicates the location of the target 12 to the object being navigated 10 via a data link 20 from the UAV 18 to the object being navigated 10. The object being navigated 10 receives/detects at least one signal (in any one, two, or three—depending on the embodiment—of the three signal frequencies) from at least three of the marks (2, 4, 6, and 8 of FIG. 1) via the single, dual, or tri-mode seeker on the object being navigated 10 that allows the object being navigated 10 to actively calculate the angle, angular rates, ranges and/or range rates to the marks (2, 4, 6, and 8 of FIG. 1). Using the calculated angle, angular rates, ranges and/or range rates to the marks and the information transmitted to the object being navigated 10 (the location of the marks (2, 4, 6, and 8 of FIG. 1)), the location of the object being navigated 10 can be determined and its navigation solution updated. As the object being navigated 10 knows the location of the target 12 as well as its present location, the object being navigated 10 can then calculate a route to the target 12.

In another embodiment, the a priori geo-locations of the marks are known by the object being navigated 10 (loaded onto the object being navigated 10). The object being navigated 10 receives/detects a signal (in any one, two, or three—depending on the embodiment—of the three signal frequencies) from each of the marks (2, 4, 6, and 8 of FIG. 1) via the single, dual, or tri-mode seeker on the object being navigated 10 that allows the object being navigated 10 to actively calculate the angle, angular rates, ranges and/or range rates to the marks (2, 4, 6, and 8 of FIG. 1). Using the calculated angle, angular rates, ranges and/or range rates to the marks and the information transmitted to the object being navigated 10 (the location of the marks (2, 4, 6, and 8 of FIG. 1)), the location of the object being navigated 10 can be determined and its navigation solution updated. As the object being navigated 10 knows the location of the target 12 as well as its present location, the object being navigated 10 can then calculate a route to the target 12.

Various permutations are possible depending in part on:
1) the characteristics of the marker (marker substance and mark), i.e., which of the following is used/included in the marker (marker substance and mark):
   a) an exothermic material which glows in the infrared (IR);
   b) a bright day-glow color detectable by an electro-optic seeker; and
   c) a radio frequency ID (RFID) or a material which reflects, or responds to, radio frequency or millimeter wave signals;
2) the capability of the object being navigated to detect the frequency(ies) of the marks, i.e., whether the object being navigated has a single, dual, or tri-mode seeker;
3) the circumstances presented by the situation the method is practiced in (for example, even if all three frequencies are covered in the marker (marker substance and mark), and the object being navigated has a tri-mode seeker, it is possible that only one or two of the frequencies can be identified for whatever reason; therefore, only one or two of the frequencies will be used to update a navigation solution);
4) what detects the location of the mark, i.e., satellite, UAV, and how that is communicated to the object being navigated 10.

A person having ordinary skill in the art will recognize that the permutations claimed in the claims as originally filed are not the only possible permutations based on the Detailed Description.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method of navigating to a target comprising:
providing a location of a target to an object being navigated;
creating at least three marks by deploying a plurality of markers from at least one aerial vehicle, wherein each of said plurality of markers comprises: a Radio Frequency Identification (RFID) tag, a bright day-glow color detectable by an electro-optic seeker, and an exothermic material detectable in the infrared (IR) electromagnetic frequency;
providing a priori a location of said at least three marks to said object being navigated;
causing each said RFID tag of each of said plurality of markers to activate and start sending data by emitting an activation signal from transceiver and antenna associated with said object being navigated to said target;
receiving a radio frequency (RF) signal at said object being navigated from each of said RFID tag of each of said plurality of markers;
receiving an IR signal at said object being navigated from each of said exothermic material of each of said plurality of markers; calculating an angle to said markers using information from said RF signal and information from said IR signal;
and determining a location of said object in relation to said target using said angle, said location of said at least three marks, and said location of said target.

* * * * *